Jan. 19, 1937.    F. G. SEIFARTH    2,068,198
ROLLER BEARING
Filed March 19, 1932    3 Sheets-Sheet 1
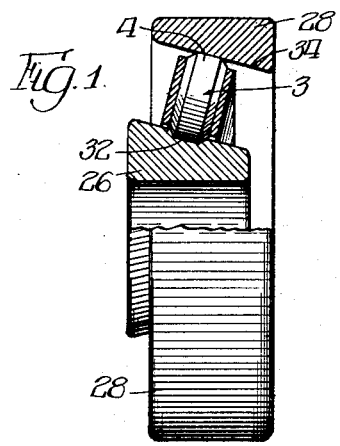
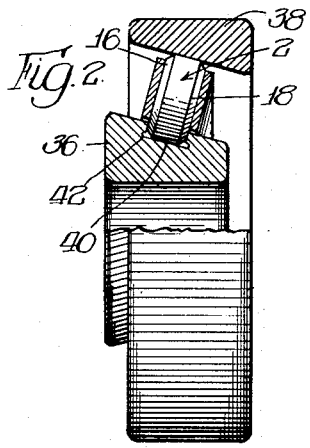
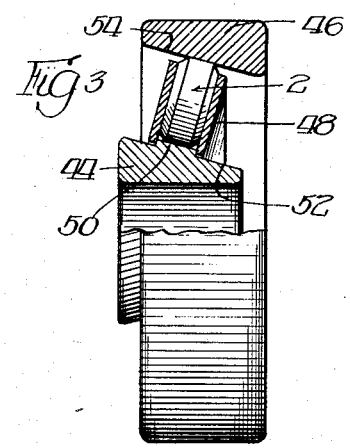
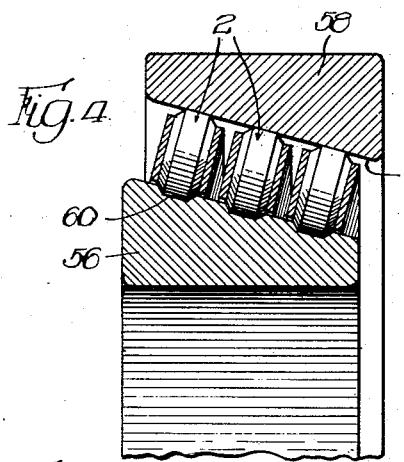
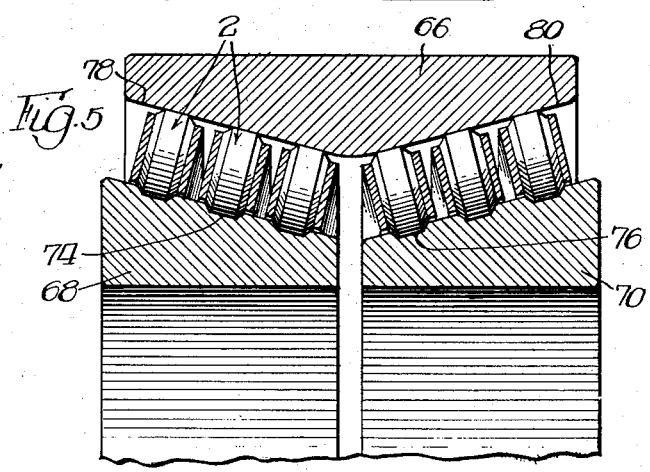
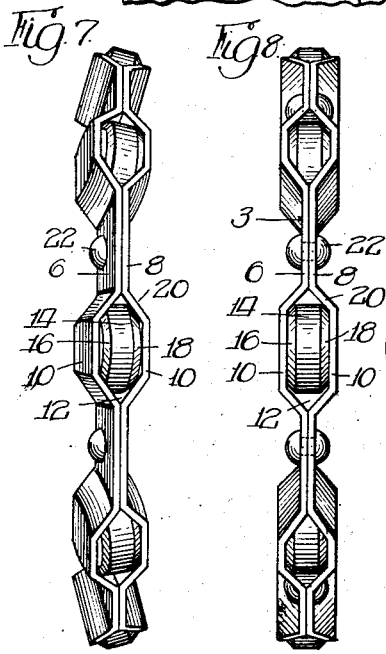
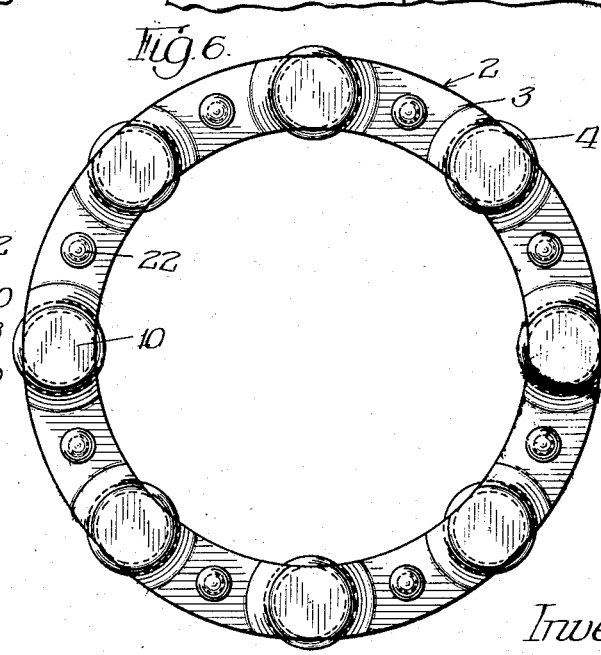
Inventor
Frederick G. Seifarth,
By Wilkinson, Huxley, Byron + Knight
attys.

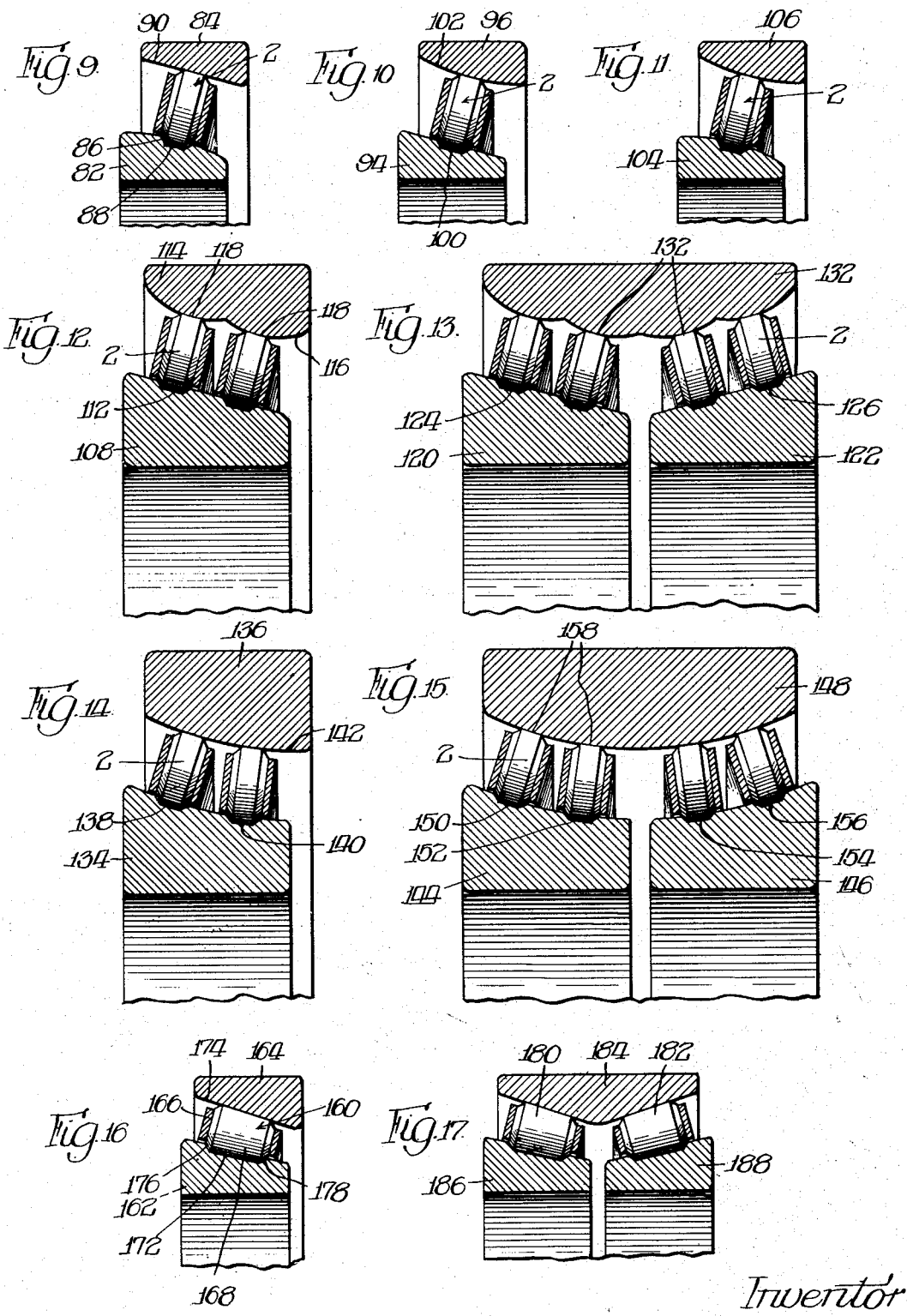

Jan. 19, 1937.　　　　F. G. SEIFARTH　　　　2,068,198
ROLLER BEARING
Filed March 19, 1932　　　　3 Sheets-Sheet 3
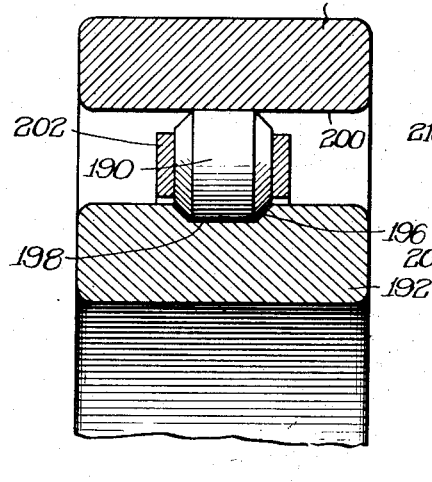
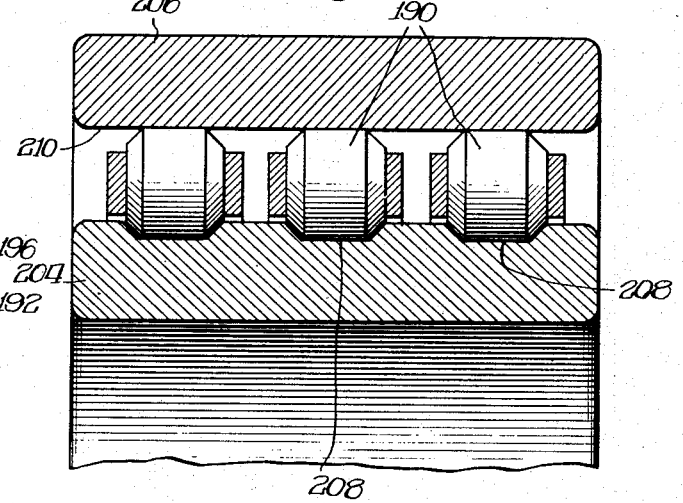
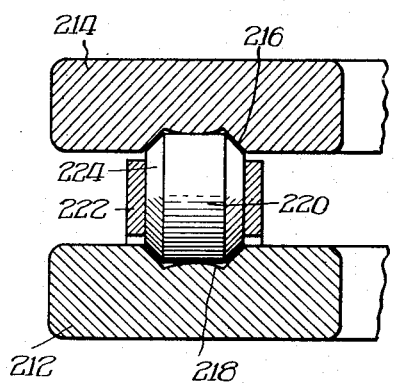
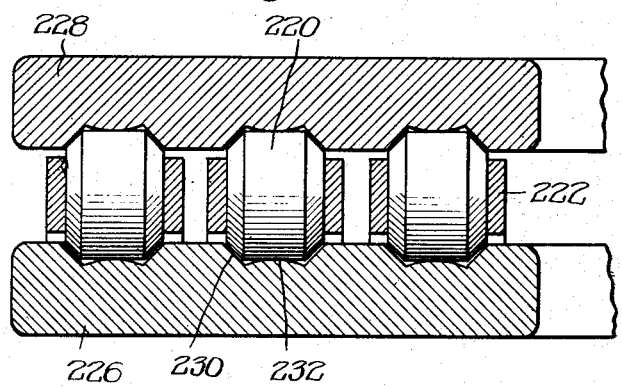
Inventor
Frederick G. Seifarth,
By Wilkinson, Huxley, Byron & Knight
attys Patented Jan. 19, 1937

2,068,198

UNITED STATES PATENT OFFICE 2,068,198

ROLLER BEARING

Frederick G. Seifarth, Chicago, Ill.

Application March 19, 1932, Serial No. 599,960

32 Claims. (Cl. 308—214)

The present invention relates to bearing devices or assemblies and more in particular to anti-friction roller bearing devices or assemblies.

Among the objects of the present invention is to provide a novel bearing assembly particularly adapted for ordinary speed work which may be cheaply constructed and assembled and adapted to meet all requirements of service.

Another object of the present invention is to provide a novel bearing assembly in which the anti-friction or roller bearings thereof are adapted to engage with the bearing members for rolling contact therewith and in which the anti-friction members are guided by means cooperating with surfaces other than the rolling surfaces.

The present invention comprehends the idea of providing a novel anti-friction or roller bearing unit adapted for use in connection with spaced bearing members, which includes a retaining member adapted to cooperate with surfaces other than the rolling surfaces of the anti-friction members for guiding the same, thus increasing the length of life of these roller bearing members.

Still another object of the present invention is to provide a novel bearing assembly or device in which the anti-friction or roller bearing members are formed with surface portions angularly disposed in relation to the rolling surfaces thereof with means or a surface portion which is adapted to cooperate for properly guiding these anti-friction or roller bearing members against lateral displacement.

The present invention contemplates the idea of providing a novelly constructed retainer member provided with a plurality of pockets adapted to irremovably secure these anti-friction or roller bearing members in association therewith, and in which the pockets are provided with wall portions adapted to cooperate with surfaces angularly disposed in relation to the rolling surfaces of the anti-friction members for properly guiding these anti-friction or roller bearing members.

Still another object of the present invention is to provide a bearing assembly or device including an anti-friction unit having a retaining member provided with surfaces cooperating with surfaces other than the rolling surfaces of these anti-friction or roller bearing members, and in which this anti-friction unit is associated with a bearing member having a grooved portion adapted to receive these anti-friction or roller bearing members.

A still further object of the present invention is to provide a novel bearing assembly in which the anti-friction or roller bearing members have contacting engagement with a raised or elevated portion of one of the spaced bearing members, the retaining member for these anti-friction members being adapted to engage with this raised portion to prevent lateral displacement of the anti-friction unit.

A still further object of the present invention is to provide a novel bearing assembly in which a plurality of groups of anti-friction or roller bearing members are independently disposed between the spaced bearing members of the device and are independently guided. More particularly, the present invention includes the idea of providing a plurality of spaced and independent anti-friction or roller bearing units in which the anti-friction or roller bearings of each of the units are independently guided by the retaining member for these units.

Still another object within the purview of the present invention is to provide a novel retaining member or cage for a bearing assembly, this retaining member comprising a pair of plates formed with a plurality of spaced, depressed or recessed portions adapted to coincide with similar depressions or recesses of the other member so as to provide pockets for irremovably positioning the anti-friction or roller bearing members in association therewith, suitable means being provided for securing these plate members together. The present invention also includes the idea of so forming the walls of these pockets whereby the same are adapted to cooperate with surface portions angularly disposed in relation to the rolling surfaces of the anti-friction or roller bearing members for properly guiding the same.

Other objects, features, capabilities and advantages are comprehended by the invention, as will later appear and as are inherently possessed thereby.

Referring to the drawings:

Figure 1 is a view in elevation of an embodiment of the present invention and having parts broken away and disclosed in cross section to show the construction thereof more in detail.

Figure 2 is a view similar to Figure 1 disclosing another embodiment of the present invention;

Figure 3 is a view similar to Figures 1 and 2 disclosing still another embodiment of the present invention;

Figure 4 is a fragmentary view in cross section of a further alternative arrangement made in accordance with the present invention;

Figure 5 is a fragmentary view in cross section of another alternative arrangement made in accordance with the present invention;

Figure 6 is a view in elevation of an anti-friction or roller bearing unit made in accordance with the present invention;

Figure 7 is a view in end elevation of a roller bearing unit such as shown in Figure 6 and made in accordance with the present invention;

Figure 8 is a view in end elevation of a roller bearing unit such as shown in Figure 6 of the drawings and disclosing an alternative construction for use in conjunction with certain of the bearing assemblies made in accordance with the present invention;

Figures 9 to 19 inclusive, are fragmentary views in cross section of still further alternative constructions made in accordance with the present invention; and Figures 20 and 21 are fragmentary views in cross section of still further alternative embodiments made in accordance with the present invention and disclosing thrust load bearings.

Referring now more in detail to the drawings, and more in particular to Figures 1 to 5 inclusive, and Figures 9 to 19 inclusive, various embodiments made in accordance with the present invention are disclosed as including a roller bearing unit 2 comprising a retaining member 3 adapted to irremovably secure a plurality of rollers 4 in association therewith and in spaced relation. This unit may comprise a pair of plate members 6 and 8, each of which is formed with a plurality of spaced recessed portions 10 adapted to be placed in coinciding relation with a similar recess provided on the opposite plate to provide a plurality of pockets 12 which are adapted to embrace the roller members 4 and irremovably secure the same in association with this retaining member 3.

The roller members 4 are substantially cylindrical in shape to form a rolling surface 14 having contacting engagement with spaced bearing members, as will be later more fully disclosed. These roller bearing members are further formed with surface portions 16 and 18 angularly disposed in relation to the rolling surface 14 and which have cooperative guiding relation with the angularly disposed wall portions, such as 20, forming a part of the recessed portions 10 of the plate members 6 and 8. In assembling the unit 2, the roller members 4 may be inserted within the recessed portions 10 of one of the plates and the other plate placed over the same, as clearly shown in Figures 7 and 8 of the drawings. These plate members 6 and 8 may then be suitably secured together to form a completed unit, as by means of a plurality of rivets or the like 22, passing through the connecting portions 24 between adjacent recesses 10 of the plate members.

In Figure 7 of the drawings, the retaining member 3 is disclosed as being of dished construction, which is particularly adapted for use in conjunction with certain of the embodiments to be hereinafter more fully disclosed, this retaining member having its medial plane in a plane constituted by a portion of a conical surface generated by a straight line revolved about an apex coinciding with a point on the axis of rotation of the retaining member. In Figure 8 of the drawings, however, the medial plane of the retaining member 3 is substantially normal to the axis of rotation, this retaining member with its associated roller bearing members being adapted for use in conjunction with bearing assemblies to be later more fully disclosed.

In Figure 1 of the drawings, an anti-friction or roller bearing unit of the type disclosed in Figure 7 of the drawings is shown as being positioned between the spaced bearing members, such as the inner racering or cone 26, and the outer cup or racering 28. In this embodiment, the racering 26 is formed with a grooved bearing surface 32 defined as a portion of a conical surface having an apex coinciding with a point on the axis of rotation of this bearing member 26 for receiving the roller members 4. The roller members 4, as previously described, are formed with the rolling surface 14 engageable with a bearing surface provided in the groove 32 and a bearing surface 34 which are substantially parallel. The roller members 4 used in this assembly are provided with the surfaces 16 and 18, which are adapted to cooperate with similar surfaces forming the side portions of the groove 32, thereby holding the assembly 2 against lateral displacement and providing means whereby the unit 2 may be adjustably positioned between the bearing members 26 and 28.

As hereinbefore pointed out, the surfaces 16 and 18 of the roller members 4 are adapted to cooperate with the surfaces of the wall portions 20 forming the pockets of the retaining member 3. This particular construction is of importance in that there is no part of the retaining member which contacts with the rolling surface 14 of these roller members for the purpose of guiding the same during operation in the assembly. This construction whereby the roller members 4 are guided by means of the surfaces 16 and 18 and the cooperating surfaces of the retaining member provides a structure wherein the rolling surfaces of these roller bearing members are not subjected to wear which would otherwise cause uneven contact between the various elements, resulting in misalignment of the parts and causing undue wear thereof.

In Figure 2 of the drawings, the roller bearing unit 2 is shown in conjunction with an inner and outer bearing member 36 and 38, and a groove 40 is provided in the bearing member 36 for receiving the roller bearing members 4, this groove being formed with laterally extending groove portions 42 spaced in relation to the surfaces 16 and 18 of the roller members. It will be clearly seen that in this embodiment the sides of the groove 42 merely contact with the end surfaces of the roller bearing members 4 for guiding purposes.

In Figure 3 of the drawings, the roller bearing unit 2 is shown in conjunction with an inner and outer bearing member 44 and 46, the retaining member 48 of this roller bearing unit 2 having plate portions of increased depth or width in a radial direction, as compared with the plates 6 and 8 of the retaining member shown in Figures 6, 7 and 8 of the drawings, this retaining member being adapted to overlap and engage with a raised portion 50 formed on the surface 52 of the bearing member 44. In this embodiment, the bearing surface 54 of the bearing member 46 is substantially parallel to the surface 52 and the surface of the raised portion of the inner bearing member 44, these surfaces, as in Figure 1 of the drawings, being generated by rotation of lines about points on the axis of rotation of either one of these bearing members.

In Figure 4 of the drawings, a plurality of roller bearing units 2 are shown as being disposed between an inner bearing member 56 and an outer bearing member 58, the bearing member 56 being formed with a plurality of grooves 60 corresponding to the groove 32 of the embodiment shown in Figure 1 of the drawings. The bearing surfaces 60 and 64 of the bearing members 56 and 58, respectively, are substantially parallel to each other and are constituted by a portion of conical surfaces formed in a manner as hereinbefore described. In this embodiment, it will be observed that each of the roller bearing units is independent of the other, and the roller bearing members of each unit are independently guided.

In Figure 5 of the drawings, a plurality of roller bearing units 2 are disclosed as being disposed between a single outer bearing member 66 and a pair of inner bearing members 68 and 70. The inner bearing members 68 and 70 are formed with bearing surfaces 74 and 76 angularly disposed with one another corresponding to the grooves 60 of Figure 4 of the drawings, the bearing surfaces 74 and 76 being substantially parallel to the bearing surfaces 78 and 80, respectively, formed on the outer bearing member 66, each of these bearing surfaces constituting a portion of a conical surface, as hereinbefore described. As in the embodiment shown in Figure 4 of the drawings, each of the roller bearing units is independently guided and the groups of roller bearing members thereof are likewise independently guided in the retaining member for each of the units. In this particular embodiment, the roller bearing units between the bearing surfaces 74 and 78, as likewise the roller bearing units between the bearing surfaces 76 and 80 may be independently adjusted by means of the proper adjustment of either one of the inner bearing members 68 and 70.

In Figure 9 of the drawings, a roller bearing assembly 2 is disclosed as being disposed between an inner bearing member 82 and an outer bearing member 84, the inner bearing member 82 being formed with a groove 86 provided with an arcuate bearing surface 88 adapted to cooperate with the rolling surface of the roller members of the unit 2. In this particular embodiment, the bearing surface 90 of the outer bearing member 84 corresponds with the bearing surface of either of the other members of the embodiments shown in Figures 1 to 3 inclusive, whereas the bearing surface 88 of the inner bearing member 82 is substantially arcuate in planes through the axis of rotation of this bearing member.

In Figure 10 of the drawings, a roller bearing assembly 2 is shown as being disposed between an inner bearing member 94 and an outer bearing member 96, the inner bearing member 94 being formed with a grooved conical bearing surface 100 adapted to receive the roller members of the unit 2, whereas the bearing surface 102 varies from the bearing surface 90 of the embodiment shown in Figure 9 of the drawings in that the same is substantially arcuate in planes through the axis of rotation of this bearing member.

In Figure 11 of the drawings, a roller bearing unit 2 is shown as being disposed between an inner bearing member 104 corresponding to the bearing member 82 of the embodiment shown in Figure 9 of the drawings, and an outer bearing member 106 corresponding to the bearing member 96 of the embodiment shown in Figure 10 of the drawings.

In Figure 12 of the drawings, a plurality of roller bearing units 2 are disclosed as being disposed between an inner bearing member 108 corresponding with the roller bearing member 56 of the embodiment shown in Figure 4 of the drawings, the same being provided with grooved bearing surfaces 112 for receiving the roller members of each of the units independent of each other and an outer bearing member 114 formed with a bearing surface 116 having individual bearing portions 118, substantially arcuate shaped in planes through the axis of rotation of the bearing member, for each of the roller bearing members of the units.

In Figure 13 of the drawings, a plurality of roller bearing units 2 are disclosed in association with the inner bearing members 120 and 122 corresponding to the bearing members 68 and 70 of the embodiment shown in Figure 5 of the drawings, these bearing members 120 and 122 being formed with grooved bearing surfaces 124 and 126 for receiving the roller members of each of the units 2, the bearing surfaces 124 and 126 being angularly disposed and constituting a conical surface. The roller bearing units 2 of the present embodiment are disposed between the inner bearing members 120 and 122 and a single outer bearing member 130, this outer bearing member 130 being formed with a plurality of bearing portions 132 providing a bearing surface substantially arcuate in shape in planes through the axis of rotation of this bearing member 130 for contacting engagement with each of the roller bearing members of each of the units 2.

In Figure 14 of the drawings, a plurality of roller bearing units 2 are shown as being disposed between an inner bearing member 134 and an outer bearing member 136, the bearing member 134 being formed with angular grooved bearing surfaces 138 and 140 adapted to receive the angular members of each of the units at different angular relation to each other. The bearing member 136 is formed with a continuous convex bearing surface 142.

In Figure 15 of the drawings, a plurality of roller bearing units 2 are disclosed as being disposed between the inner bearing members 144 and 146 and an outer bearing member 148. In this embodiment, the inner bearing member 144 corresponds in construction with the bearing member 134 of the embodiment shown in Figure 14 of the drawings, and is provided with angular grooved bearing surfaces 150 and 152 for receiving the bearing members of the units 2. The inner bearing member 146 is of a construction similar to the bearing member 144 with the exception that the same is provided with grooved bearing surfaces 154 and 156 for receiving the roller members of the units 2, opposed in angular relation to inner bearing member 144. The outer bearing member 148 is formed with a continuous convex bearing surface 158 and arcuate in planes through the axis of rotation thereof.

In Figure 16 of the drawings, a roller bearing unit 160 is shown as being disposed between an inner bearing member 162 and an outer bearing member 164. In this embodiment, the roller bearing unit 160 is formed with a retaining member 166 corresponding substantially to the retaining member 3 of the previously described embodiments, this unit, however, having a plurality of tapered roller members 168 associated therewith. In this embodiment, the inner bearing member 162 corresponds substantially with the inner bearing member 26 of the embodiment shown in Figure 1 of the drawings and is provided with a grooved bearing surface 172 for receiving the tapered roller bearing members 168. The outer bearing member 164 corresponds with the outer bearing member 28 of the embodiment shown in Figure 1 of the drawings and is provided with a bearing surface 174 cooperating with the roller bearing members 168. As in the previously described embodiments, the tapered roller members 168 are formed with angularly disposed surfaces 176 and 178 adapted to cooperate with inclined or angularly disposed surfaces of the retaining member 166, whereby these members are properly guided, these guiding surfaces being independent of the rolling surfaces of these roller members.

In Figure 17 of the drawings, roller bearing units 180 and 182 corresponding to the roller bearing unit 160 of the previously described embodiment, are shown in association with an outer bearing member 184 and a plurality of inner bearing members 186 and 188 corresponding substantially to the bearing members 66, 68 and 70 of the embodiment shown in Figure 5 of the drawings.

In Figure 18 of the drawings, a roller bearing unit 190 is disclosed in a radial load bearing comprising an inner bearing member 192 and an outer bearing member 194, the bearing member 192 being formed with a groove 196 having a bearing surface 198, while the bearing member 194 is formed with a bearing surface 200 substantially parallel with the bearing surface 198, each of these bearing surfaces being substantially parallel to the axis of rotation of the bearing assembly. In this embodiment, the roller bearing unit 190 is provided with a plurality of roller members which are properly positioned and guided, as by means of a retaining member 202 corresponding in construction to the retaining member disclosed in Figure 8 of the drawings.

In Figure 19 of the drawings, a plurality of these roller bearing units 190 are disclosed as being disposed between an inner bearing member 204 and an outer bearing member 206, the inner bearing member 204 being formed with a plurality of grooves or recesses providing certain surfaces, such as 208, for the roller members of the units and which are substantially parallel to the bearing surface 210 of the outer bearing member 206. As in certain of the previously described embodiments, the groups of roller bearing members of each of the units are independently guided and each of the units is independent of one another.

In Figure 20 of the drawings, an embodiment of the present invention is disclosed in a thrust load bearing and includes spaced bearing members 212 and 214, each of which is formed with grooves, such as 216, provided with arcuate bearing surfaces 218, these grooves being adapted to receive the roller members 220 of a roller bearing unit. This roller bearing unit includes a retainer 222 which may be formed with suitable surfaces, such as the surfaces formed by the walls 20 of the units 2 which are adapted to cooperate with angularly disposed surfaces, such as the surfaces 224 of the roller bearing members 220 in order to properly guide these roller bearing members during operation of the device, it being of course understood, as in the previously described embodiments, that no part of the rolling surface of these roller bearing members is in contacting engagement with the retaining member 222.

In Figure 21 of the drawings, a plurality of roller bearing units, such as the units shown in Figure 20 of the drawings, are disclosed in association with spaced bearing members 226 and 228, each of which is provided with a plurality of grooves, such as 230, formed with arcuate bearing surfaces 232, and which cooperate with the rolling surface of the roller members 220. The roller bearing units, including groups of roller bearing members 220, and their retaining member 222 associated therewith, are of a construction similar to the corresponding parts in the assembly shown in Figure 20 of the drawings. As hereinbefore disclosed, the roller bearing units are independent of one another and the groups of roller bearing members of each unit are independently guided.

From the above disclosure, it will be quite apparent that a roller bearing assembly made in accordance with the present invention is particularly adapted for ordinary speed devices, such as automobiles, electric motors, shaft hangers and the like, and the same may be easily and cheaply made and constructed and are free from excessive wear, which would otherwise necessitate the frequent removal for repairs or a complete replacement.

While I have herein described and upon the drawings shown an illustrative embodiment of the invention, it is to be understood that the invention is not limited thereto but may comprehend other constructions, arrangements of parts, details and features without departing from the spirit of the invention.

I claim:

1. An anti-friction unit for a bearing device, comprising a retaining member formed with a plurality of pockets having plane wall portions, a plurality of substantially cylindrical shaped roller members positioned within said pockets and having plane end portions contacting said plane wall portions, said members having a rolling surface disposed in spaced relation to said retaining member and surface portions angularly disposed in relation to said rolling surface, and guide portions on said retaining member cooperating with said angularly disposed surface portions only for guiding said anti-friction members.

2. An anti-friction unit for a bearing device, comprising a retaining member formed with a plurality of pockets having plane wall portions, a plurality of substantially cylindrical shaped roller members positioned within said pockets and having plane end portions contacting said plane wall portions, said members having a rolling surface disposed in spaced relation to said retaining member and surface portions angularly disposed in relation to said rolling surface, said pockets having angularly disposed wall portions extending from said plane wall portions and cooperating with said angularly disposed surface portions only for guiding said anti-friction members.

3. An anti-friction unit for a bearing device, comprising a retaining member having spaced pockets, and web portions connected directly together between said pockets, said pockets having plane central walls disposed axially of said webs and having plane inclined portions merging therewith to form substantially V-shaped end portions for said pockets, and substantially cylindrical roller members having guiding relation with said central walls and said V-shaped end portions.

4. A bearing unit comprising a retaining member having a pair of plates formed with connecting webs and spaced recess portions extending away from the plane thereof and adapted to coincide to form pockets, said recess portions having a centrally disposed plane surface and inclined wall portions adjacent thereto, means connecting said webs for securing said plates together, and roller bearings disposed in said pockets adapted to engage said plane surfaces and inclined wall portions.

5. In a bearing assembly, the combination of spaced bearing members, a plurality of anti-friction units, each of said units being independent of and in spaced relation to one another, each of said units comprising a plurality of rollers having a substantially cylindrical load carrying surface of shorter width than their diameter cooperating with said bearing members, and means for guiding the same.

6. In a bearing assembly, the combination of spaced bearing members, a plurality of anti-friction units, each of said units being independent of and in spaced relation to one another, each of said units comprising a plurality of rollers having a substantially cylindrical load carrying surface of shorter width than their diameter cooperating with said bearing members, and a cage for guiding the same.

7. In a bearing assembly, the combination of spaced bearing members, one of said members being provided with a groove, a plurality of cylindrically shaped anti-friction members received in said groove and engageable with said bearing members for rolling contact therewith, said anti-friction members having a centrally disposed rolling surface, end surfaces and guide surfaces therebetween, the diameter of said end surfaces being substantially greater than the width of said rolling surface, and a retaining member for said anti-friction members and having surfaces cooperating with substantially the entire surface of said ends and with said guide surfaces only of said anti-friction members for guiding said anti-friction members.

8. In a bearing assembly, the combination of spaced bearing members, one of said members having a raised portion providing shoulders, a plurality of anti-friction members between said raised portion and the other of said bearing members and engageable therewith for rolling contact, said other bearing member being provided with a continuous roller engaging surface permitting unrestricted adjustment for wear upon relative axial movement of said bearing members, and a retaining member for said anti-friction members and having portions fitting over said raised portion and engaging said shoulders.

9. In a bearing assembly, the combination of spaced bearing members, one of said members having a raised portion providing shoulders, a plurality of anti-friction members between said raised portion and the other of said bearing members and engageable therewith for rolling contact, said other bearing member being provided with a continuous roller engaging surface permitting unrestricted adjustment for wear upon relative axial movement of said bearing members, and a retaining member for said anti-friction members and having portions fitting over said raised portion and engaging said shoulders, said retaining member having a surface cooperating with a surface other than said rolling surface for guiding said anti-friction members.

10. An anti-friction unit for a bearing device, comprising a retaining member formed with a plurality of pockets having oppositely disposed walls, said walls including a centrally disposed plane surface and angularly disposed guide surfaces, and a plurality of rollers positioned within said pockets and having cylindrical load carrying surfaces, said rollers having plane end portions engageable with said centrally disposed surface and angularly disposed portions engageable with said guide surfaces only whereby the same are guided during movement.

11. In a bearing assembly, the combination of an inner and outer race-ring, one of said race-rings having a groove, a plurality of cylindrical roller members received in said groove, said roller members having a load carrying surface of shorter length than the diameter thereof, the other of said race-rings having a bearing surface cooperating with said roller members whereby said race-rings are adjustable for wear, and a retaining member for said roller members and having surfaces cooperating with surfaces other than the load carrying surface only of said roller members for guiding the same.

12. In a bearing assembly, the combination of an inner and outer race-ring, a groove in said inner race-ring, a plurality of roller members received in said groove, said outer race-ring having a bearing surface cooperating with said roller members whereby said assembly may be adjusted for wear upon relative axial movement of said race-rings, and a retaining member for said roller members and having surfaces cooperating with surfaces other than the load carrying surface only of said roller members for guiding the same.

13. In a bearing assembly, the combination of spaced bearing members, one of said bearing members being provided with a plurality of grooves, a plurality of anti-friction units between said bearing members, each of said units being in spaced relation and having a plurality of roller members received in a groove of said bearing member and cooperating with the other of said members, said other of said bearing members having a roller cooperating bearing surface so disposed that said assembly may be adjusted for wear upon relative axial movement of said bearing members, and a retaining member for each unit spaced in relation to one another for guiding the roller members.

14. In a bearing assembly, the combination of an outer race-ring, a plurality of inner race-rings, certain of said race-rings being provided with a plurality of grooves, a plurality of anti-friction units associated with each of said inner race-rings and disposed between said race-rings, each of said units having a plurality of roller members received in a groove of said race-ring and cooperating with the other of said race-rings, and a retaining member for each unit spaced in relation to one another for guiding the roller members.

15. In a bearing assembly, the combination of an outer race-ring, a plurality of inner race-rings, certain of said race-rings being provided with a plurality of grooves, a plurality of anti-friction units associated with each of said inner race-rings and disposed between said race-rings, each of said units having a plurality of roller members received in a groove of said race-ring and cooperating with the other of said race-rings, the other of said bearing members having a roller cooperating bearing surface so disposed that said assembly may be adjusted for wear upon relative axial movement of said inner race-rings with said outer race-ring.

16. In a bearing assembly, the combination of spaced bearing members, one of said members being provided with a groove, an anti-friction unit disposed between said members, said unit comprising a plurality of rollers having a central rolling surface and marginal surfaces extending therefrom, said groove having a surface cooperating with the rolling surface of said rollers and the rollers having their rolling surface in cooperative relation with the other of said bearing members whereby said bearing members may be axially adjusted for wear, and a retaining member for said rollers having guide surfaces cooperating with said marginal and the end surfaces only of said rollers.

17. In a bearing assembly, the combination of spaced bearing members, one of said members being provided with a plurality of grooves, a plurality of anti-friction units disposed between said members and in spaced relation one to the other, each of said units having a plurality of rollers provided with a central rolling surface and marginal surfaces extending therefrom, said grooves having a surface cooperating with the rolling surface of said rollers and the rollers having their rolling surface in cooperative relation with the other of said bearing members whereby said bearing members may be axially adjusted for wear, and a retaining member for each of said units having guide surfaces cooperating with said marginal and the end surfaces only of said rollers.

18. In a bearing assembly, the combination of spaced bearing members, one of said members being provided with a groove, an anti-friction unit disposed between said members, said unit comprising a plurality of rollers having a central rolling surface and marginal surfaces extending therefrom, said groove having surfaces cooperating with said surfaces of said rollers and the rollers having their rolling surface in cooperative relation with the other of said bearing members whereby said bearing members may be axially adjusted for wear, and a retaining member for said rollers having guide surfaces cooperating with said marginal and the end surfaces only of said rollers.

19. In a bearing assembly, the combination of spaced bearing members, one of said members being provided with a plurality of grooves, a plurality of anti-friction units disposed between said members and in spaced relation one to the other, each of said units having a plurality of rollers provided with a central rolling surface and marginal surfaces extending therefrom, said grooves having surfaces cooperating with said surfaces of said rollers and the rollers having their rolling surface in cooperative relation with the other of said bearing members whereby said bearing members may be axially adjusted for wear, and a retaining member for each of said units having guide surfaces cooperating with said marginal and the end surfaces only of said rollers.

20. In a bearing assembly, the combination of an outer race-ring, a plurality of spaced and independently adjustable inner race-rings, anti-friction units between said inner race-rings and outer race-ring, said units comprising a plurality of rollers having a central rolling surface, end surfaces, and angularly disposed marginal surfaces extending therebetween, and a retaining member for said rollers having guide surfaces cooperating with said marginal and end surfaces only of said rollers.

21. In a bearing assembly, the combination of an outer race-ring, a plurality of spaced and independently adjustable inner race-rings, anti-friction units between said inner race-rings and outer race-ring, each of said units having a plurality of roller members having a central rolling surface, end surfaces, and angularly disposed marginal surfaces extending therebetween, certain of said race-rings being provided with means cooperating with each of said units for preventing axial movement of said units, and a retaining member for said rollers having guide surfaces cooperating with said marginal and end surfaces only of said rollers.

22. In a bearing assembly, the combination of an outer race-ring, a plurality of spaced and independently adjustable inner race-rings each having a groove, an anti-friction unit disposed between each of said inner race-rings and said outer race-ring, each of said units having a plurality of roller members disposed in a groove of an inner race-ring, said outer race-ring having a roller cooperating bearing surface so disposed that said assembly may be adjusted for wear upon axial movement of said inner race-rings with said outer race-ring.

23. In a bearing assembly, the combination of an outer race-ring, a plurality of spaced and independently adjustable inner race-rings each having a groove, an anti-friction unit disposed between each of said inner race-rings and said outer race-ring, each of said units having a plurality of roller members disposed in a groove of an inner race-ring, said roller members having a central rolling surface, end surfaces, and angularly disposed marginal surfaces extending therebetween, and a retaining member for said rollers having guide surfaces cooperating with said marginal and end surfaces only of said rollers.

24. In a bearing assembly, the combination of an outer race-ring, a plurality of spaced and independently adjustable inner race-rings each having a groove, an anti-friction unit disposed between each of said inner race-rings and said outer race-ring, each of said units having a plurality of roller members disposed in a groove of an inner race-ring, said roller members having a central rolling surface, end surfaces, and angularly disposed marginal surfaces extending therebetween, and a retaining member for said rollers having guide surfaces cooperating with said marginal and end surfaces only of said rollers, said outer race-ring having a roller cooperating bearing surface so disposed that said assembly may be adjusted for wear upon axial movement of said inner race-rings with said outer race-ring.

25. In a bearing assembly, the combination of an inner and outer race-ring, a groove in one of said race-rings, and a single course of substantially cylindrical rollers disposed in said groove and having bearing relation with the other of said race-rings, said other race-ring having a convex surface permitting adjustment of said assembly upon relative axial movement of said race-rings, and a retaining member for said roller members having surfaces cooperating with said roller members for guiding the same and being free from abutting relation with said race-ring.

26. In a bearing assembly, the combination of an inner and outer race-ring, a groove in one of said race-rings, a convex bearing surface on the other of said race-rings, a single course of substantially cylindrical rollers disposed in said groove and having bearing relation with said convex surface whereby assembly may be adjusted for wear upon relative axial movement of said race-rings, and a retaining member for said roller members having surfaces cooperating with said roller members for guiding the same and being free from abutting relation with said race-ring.

27. In a bearing assembly, the combination of spaced bearing members, one of said members being provided with a groove, said groove and the other of said bearing members having frusto-conical bearing surfaces, a plurality of tapered rollers received in said groove and disposed between said bearing members, said rollers having a frusto-conical rolling surface, end surfaces and angularly disposed surfaces therebetween, and a retaining member for said rollers having surfaces cooperating with said end and angularly disposed surfaces of said rollers for guiding the same.

28. In an adjustable combined thrust and radial load bearing assembly, the combination of an outer race-ring, and an inner bearing unit, said unit comprising an inner race-ring, a plurality of cylindrical rollers having a centrally disposed cylindrical load carrying surface of shorter length than the diameter thereof which has rolling engagement with said inner race-ring, a retaining cage for said rollers, said rollers and said inner race-ring only having direct abutting relation preventing lateral displacement of said rollers with respect to said inner race-ring.

29. In a disc roller bearing, the combination of a bearing race, and an opposed bearing unit, said unit comprising a bearing race, a plurality of cylindrical rollers having a centrally disposed cylindrical load carrying surface of shorter length than the diameter thereof cooperating with said bearing races, a retaining cage for said rollers, said retaining cage of said bearing unit only having direct abutting relation with the bearing race of said unit preventing displacement of said rollers with respect to said race.

30. In an anti-friction bearing, the combination of spaced bearing members, a plurality of cylindrical rollers between said bearing members having centrally disposed cylindrical load carrying surfaces of shorter length than their diameter cooperating with said bearing members, said rollers having sloping spacing surfaces adjacent said load carrying surface, and a retaining cage for said rollers, said retaining cage having sloping surfaces cooperating with the sloping surfaces of said rollers for spacing the same.

31. In a bearing assembly, the combination of spaced bearing members, one of said members being provided with a groove, a plurality of cylindrically shaped anti-friction members received in said groove and engageable with said bearing members for rolling contact therewith, said anti-friction members having a centrally disposed rolling surface, end surfaces and guide surfaces therebetween, the diameter of said centrally disposed rolling surface being substantially greater than the width of said rolling surface, and a retaining member for said anti-friction members and having surfaces cooperating with the surface of said ends and with said guide surfaces only of said anti-friction members for guiding said anti-friction members.

32. In a bearing assembly, the combination of spaced bearing members, one of said members being provided with a groove, a plurality of cylindrically shaped anti-friction members received in said groove and engageable with said bearing members for rolling contact therewith, said anti-friction members having a centrally disposed rolling surface, end surfaces and guide surfaces therebetween, said guide surfaces being free from engaging relation with the walls defining said groove, the diameter of said centrally disposed rolling surface being substantially greater than the width of said rolling surface, and a retaining member for said anti-friction members and having surfaces cooperating with the surface of said ends and with said guide surfaces only of said anti-friction members for guiding said anti-friction members.

FREDERICK GEO. SEIFARTH.

CERTIFICATE OF CORRECTION.

Patent No. 2,068,198.

January 19, 1937

FREDERICK G. SEIFARTH.

It is hereby certified that error appears in the printed specification of the above numbered patent requiring correction as follows: Page 3, second column, line 38, for the word "angular" read roller; and that the said Letters Patent should be read with this correction therein that the same may conform to the record of the case in the Patent Office.

Signed and sealed this 16th day of March, A. D. 1937.

(Seal)

Henry Van Arsdale
Acting Commissioner of Patents.